United States Patent
Kim (10) Patent No.: US 9,423,021 B2
(45) Date of Patent: Aug. 23, 2016

(54) FLAP TYPE ELECTRONIC AUTOMATIC TRANSMISSION LEVER CONTROL METHOD

(71) Applicant: Hyundai Motor Company, Seoul (KR)

(72) Inventor: Eun-Sik Kim, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 109 days.

(21) Appl. No.: 14/536,469

(22) Filed: Nov. 7, 2014

(65) Prior Publication Data

US 2015/0167824 A1 Jun. 18, 2015

(30) Foreign Application Priority Data

Dec. 17, 2013 (KR) .......................... 10-2013-156942

(51) Int. Cl.
| | |
|---|---|
| *F16H 59/12* | (2006.01) |
| *F16H 59/10* | (2006.01) |
| *F16H 61/12* | (2010.01) |
| *F16H 61/02* | (2006.01) |

(52) U.S. Cl.
CPC .............. *F16H 59/12* (2013.01); *F16H 59/105* (2013.01); *F16H 61/0213* (2013.01); *F16H 61/12* (2013.01); *Y10T 74/2003* (2015.01)

(58) Field of Classification Search
CPC ....................................................... F16H 59/12
See application file for complete search history.

(56) References Cited

U.S. PATENT DOCUMENTS

| | | | | |
|---|---|---|---|---|
| 4,243,900 | A * | 1/1981 | Niven | H02K 37/04 310/269 |
| 8,199,114 | B1 * | 6/2012 | Jaeger | G06F 3/03545 178/18.01 |
| 2004/0107790 | A1 | 6/2004 | Maeda et al. | |
| 2006/0169085 | A1 | 8/2006 | Peuster | |
| 2006/0256090 | A1 * | 11/2006 | Huppi | A63F 13/02 345/269 |
| 2013/0025395 | A1 * | 1/2013 | Hermansson | F16H 61/24 74/473.3 |

FOREIGN PATENT DOCUMENTS

| | | |
|---|---|---|
| JP | 2006-177401 A | 7/2006 |
| JP | 2011-227900 A | 11/2011 |
| JP | 2012-216113 A | 11/2012 |

* cited by examiner

*Primary Examiner* — Ramya Burgess
*Assistant Examiner* — Timothy M Hannon
(74) *Attorney, Agent, or Firm* — Morgan, Lewis & Bockius LLP

(57) ABSTRACT

A flap type electronic automatic transmission lever control method may include a step of turning on a start-up of a vehicle by control unit, a step of detecting a touch by a transmission stage recognition sensor, a step of detecting a touch by forward or backward rotation recognition sensor, a step of detecting the touch by a transmission stage recognition sensor when the forward rotation recognition sensor detects the touch, or detecting the touch by a transmission stage recognition sensor when the backward rotation recognition sensor detects the touch, a step of rotating the transmission stage flap and the upper transmission stage flap forward or rotating the transmission stage flap and the lower transmission stage flap backward by a step motor, a step of outputting transmission signal of the transmission stage corresponding to upper or lower transmission stage flap by the control unit, and a step of turning OFF the start-up.

8 Claims, 9 Drawing Sheets

FLAP TYPE ELECTRONIC AUTOMATIC TRANSMISSION LEVER CONTROL METHOD

CROSS-REFERENCE TO RELATED APPLICATION

The present application claims priority to Korean Patent Application No. 10-2013-156942 filed on Dec. 17, 2013, the entire contents of which is incorporated herein for all purposes by this reference.

BACKGROUND OF THE INVENTION

1. Field of the Invention

The present invention relates to a method of controlling an automatic transmission device applied to vehicles, and more particularly, to a flap type electronic automatic transmission lever control method for more efficiently and safely operating an electronic automatic transmission lever constituted in a flap type.

2. Description of Related Art

In general, an automatic transmission applied to a vehicle has a transmission mode that is operated in order, such as a P stage, an R stage, an N stage, a D stage, and other stages, and in the case of a vehicle equipped with the automatic transmission in which a transmission stage is automatically changed depending on the speed or the like of the vehicle during driving, a transmission lever which enables a driver to artificially change the transmission mode of an automatic transmission depending on driving conditions is installed.

A driver of a vehicle to which an automatic transmission is applied is configured to selectively operate the transmission mode of the automatic transmission to modes such as parking (P stage), reverse (R stage), neutral (N stage), and driving (D stage), depending on the driving conditions, by operating the transmission lever.

Conventionally, tiptronic type mode switching devices have been mainly used in which the transmission lever operated by the driver is directly connected to the automatic transmission via a mechanical mechanism to directly transmit the operating force applied to the transmission lever to the automatic transmission, thereby adjusting the transmission mode.

However, in the conventional transmission mode switching device for automatic transmission in which the transmission mode is switched through the mechanical mechanism as described above, since it has been necessary to directly apply force required for adjusting the transmission mode when switching the mode through the transmission lever, convenience of driving is lowered, and since the transmission lever is installed at the center of a console on a side of a driver's seat, it has become a factor that decrease the utilization of the interior space of the automobile.

Thus, a transmission lever for an electronic automatic transmission configured so that when only small operating force is applied, by being operated by a direction and the amount of displacement set in advance, after an electronic control unit detects the direction of movement and the amount of displacement, for example, a working medium such as an actuator or an electric motor can change the transmission mode of the automatic transmission have been developed.

However, since the developed transmission lever for the electronic automatic transmission is also similar to the conventional mechanical transmission lever in an operation type, by adopting a method of operating the lever back and forth, it is hard to believe that there is a great advantage, since there is a large space occupied by the transmission lever, and ancillary devices of the transmission lever, a storage space of a cup holder or the like, and a space to install a button capable of performing a specific function are insufficient, the transmission lever protrudes upward, and thus, there is a risk of serious injury due to collision or the head and the body of the driver or the passenger at the time of accident.

In addition, there are also problems in that the beauty is not good due to the projected shape of transmission lever, the transmission stage display function of the transmission lever side is vulnerable, and thus the driver is hard to easily recognize the transmission stage.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a control method of a flap type electronic automatic transmission lever which has excellent operation feeling, improved stability, and excellent beauty, by forming a flap type electronic automatic transmission lever applied to the vehicle.

Further, another object of the present invention is to provide a control method of a flap type electronic automatic transmission lever which reduces costs and improves fuel efficiency by having a simpler configuration than the conventional transmission lever structure.

The technical problems to be solved by the present invention are not limited to the above-described technical problems, and other technical problems that are not mentioned can be clearly understood by those skilled in the art from the description of the present invention.

According to an exemplary embodiment of the present invention for solving the problems of the prior art described above, there is provided a flap type electronic automatic transmission lever control method including, a step of turning on the start-up of a vehicle by a control unit. a step of detecting a touch by a transmission stage recognition sensor mounted at the center of any one transmission stage flap of a transmission stage flap unit constituted in the order of a parking transmission stage flap (P), a reverse transmission stage flap (R), a neutral transmission stage flap (N), a driving transmission stage flap (D), and a high stage/low stage transmission stage fla, a step of detecting the touch by a forward rotation recognition sensor mounted on the upper side of the transmission stage flap or a backward rotation recognition sensor mounted on a lower side thereof, a step of detecting the touch by a transmission stage recognition sensor of an upper transmission stage flap located on the upper side of the transmission stage flap when the forward rotation recognition sensor detects the touch, or detecting the touch by a transmission stage recognition sensor of a lower transmission stage flap located on the lower side of the transmission stage flap when the backward rotation recognition sensor detects the touch, a step of rotating the transmission stage flap and the upper transmission stage flap forward or rotating the transmission stage flap and the lower transmission stage flap backward by a step motor, a step of outputting a transmission signal of the transmission stage corresponding to the upper transmission stage flap or the lower transmission stage flap by the control unit, and a step of turning off the start-up of the vehicle by the control unit.

The step of turning on the start-up of the vehicle of the present invention preferably includes a step of inputting an ON signal of the start-up button to the control unit. a step of checking status information of the vehicle by the control unit. a step of maintaining a horizontal state of the parking transmission stage flap (P) and rotating the remaining transmission stage flaps forward by the step motor when there is no abnormality in the status information of the vehicle, and a step of outputting the transmission signal of the parking transmission stage by the control unit.

The step of turning off the start-up of the vehicle of the present invention preferably includes, a step of inputting an OFF signal of the start-up button to the control unit. a step of checking status information of the vehicle by the control unit. a step of rotating all the transmission stage flaps of the transmission stage flap unit in the horizontal state by the step motor when there is no abnormality in the status information of the vehicle, and a step of turning off the start-up of the vehicle after checking the horizontal state of the transmission stage flap by the control unit.

The present invention may further include, after the step of checking the status information of a vehicle, a step of outputting a warning message to the cluster by the control unit when there is an abnormality in the state information of the vehicle.

In an exemplary embodiment of the present invention, the step of outputting the transmission signal of the transmission stage is preferably configured to output the transmission signal only in a case where a brake pedal stop lamp switch signal is generated when the upper transmission stage flap or the lower transmission stage flap corresponds to the reverse transmission stage flap.

According to another aspect of the present invention to solve the above-described problems of the prior art, there is provided a flap type electronic automatic transmission lever safety control method, in switching a transmission stage of a vehicle using the flap type electronic automatic transmission lever control method, including, a step of checking the number of transmission stage recognition sensors for simultaneously detecting the touch by the control unit, a step of checking whether a state in which the sensors for simultaneously detecting the touch among a transmission stage recognition sensor, a forward rotation recognition sensor, or a backward rotation recognition sensor are at least two or more is continued for 5 seconds or more by the control unit, when the number of the transmission stage recognition sensor for simultaneously detecting the touch is one, a step of checking whether the step motor rotates by the control unit due to the detection of the sensor, when the state in which the sensors for simultaneously detecting the touch are at least two is less than 5 seconds, and a step of checking whether all the transmission stage flaps of the transmission stage flap unit are in a horizontal state during start-up off of the vehicle by the control unit, when the step motor rotates.

The present invention preferably includes, after the step of checking the number of the transmission stage recognition sensors for simultaneously detecting the touch, a step of maintaining the existing transmission stage without switching the transmission stage and outputting a warning message to the cluster by the control unit, when the transmission stage recognition sensors for simultaneously detecting the touch are two or more.

The present invention may be configured to further include a step of outputting a warning message to the cluster by the control unit, when a state in which the sensors for simultaneously detecting the touch among the transmission stage recognition sensor, the forward rotation recognition sensor, or the backward rotation recognition sensor are at least two or more is continued for 5 seconds or more, when the step motor does not rotate even by detection of the sensor, or when all the transmission stage flaps of the transmission stage flap unit are not in a horizontal state during start-up off of the vehicle.

The present invention has an effect in which operational feeling of a driver is improved through rotation of the transmission stage flap, the risk of collision with the transmission lever is eliminated, and safety is enhanced, by applying the electronic automatic transmission lever having no protruding portion and constituted in a flap type to a vehicle and providing a controlling method thereof.

Furthermore, the present invention has an effect in which layout and appearance of the vehicle are excellent by forming a small space occupied by the transmission lever, and the costs are reduced and the fuel efficiency is improved through a simpler structure.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In order to improve operability, safety and product properties by configuring a flap type electronic automatic transmission lever, according to an exemplary embodiment of the present invention, there is provided a flap type electronic automatic transmission lever control method including, a step of turning on the start-up of the vehicle by a control unit, a step of detecting touch by a transmission stage recognition sensor mounted at the center of any one transmission stage flap of a transmission stage flap unit constituted in the order of a parking transmission stage flap (P), a reverse transmission stage flap (R), a neutral transmission stage flap (N), a driving transmission stage flap (D), and a high stage/low stage transmission stage flap, a step of detecting the touch by a forward rotation recognition sensor mounted on the upper side of the transmission stage flap or a backward rotation recognition sensor mounted on the lower side thereof, a step of detecting the touch by the transmission stage recognition sensor of the upper transmission stage flap located on the upper side of the transmission stage flap when the forward rotation recognition sensor detects the touch or detecting the touch by the transmission stage recognition sensor of the lower transmission stage flap located on the lower side of the transmission stage flap when the backward rotation recognition sensor detects the touch, a step of rotating the transmission stage flap and the upper transmission stage flap forward or rotating the transmission stage flap and the lower transmission stage flap backward by a step motor, a step of outputting a transmission signal of the transmission stage corresponding to the upper transmission stage flap or the lower transmission stage flap by the control unit, and a step of turning off the start-up of the vehicle by the control unit.

Prior to description of the control method of the flap type electronic automatic transmission lever of the present invention, the flap type electronic automatic transmission lever will be described as follows.

Figure 1:
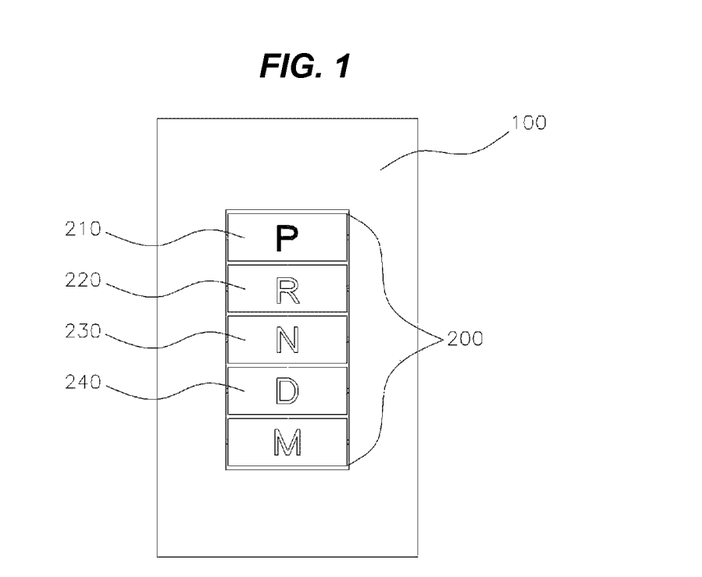
FIG. 1 is a plan view of a flap type electronic automatic transmission lever according to an exemplary embodiment of the present invention.
Figure 2:
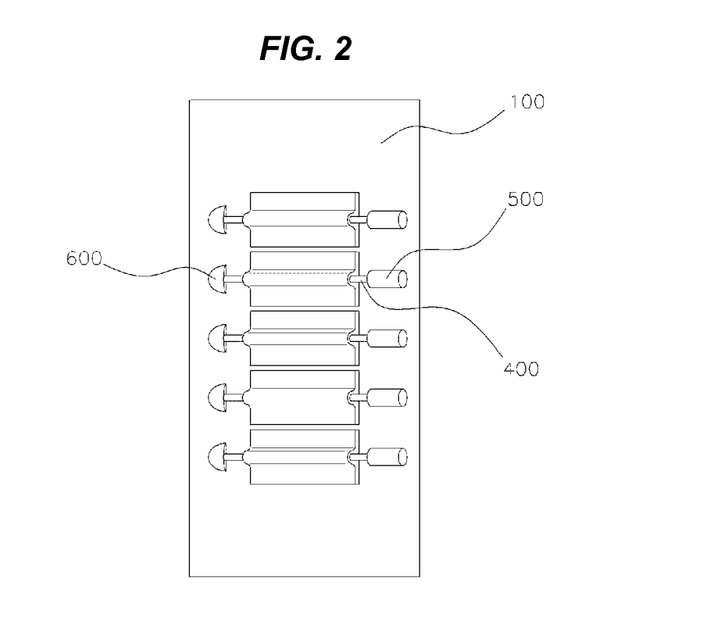
FIG. 2 is a rear view of the flap type electronic automatic transmission lever according to an exemplary embodiment of the present invention.
Figure 3:
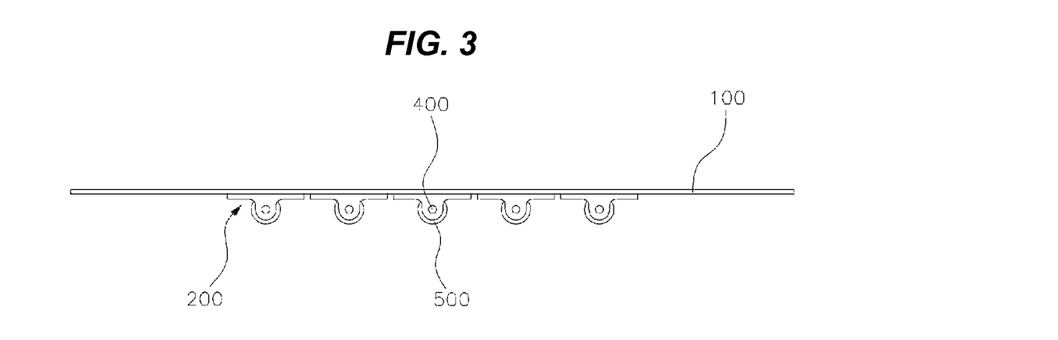
FIG. 3 is a side view of the flap type electronic automatic transmission lever according to an exemplary embodiment of the present invention.

The flap type electronic automatic transmission lever is configured to include a console surface 100 for fixing the flap type electronic automatic transmission lever between a driver seat and a passenger seat of a vehicle, a transmission stage flap unit 200 that is located at the center of the console surface, is electrically connected to a transmission control unit (TCU) of the vehicle, and is constituted by at least four or more transmission stage flaps, a touch sensor unit 300 that is attached to the transmission stage flap, a shaft 400 that is connected to the lower part of the transmission stage flap so that the transmission stage flap can rotate, a step motor 500 that is connected to one terminal end of the shaft, and a shaft fixing unit 600 that is connected to an opposite terminal end of the shaft, wherein the flap type electronic automatic transmission lever displays so that the driver can easily know the current transmission stage of the vehicle by additionally disposing a light source on the lower parts of each of the transmission stage flaps and lighting only the light source of the lower part of the transmission stage flap corresponding to the current transmission stage.

Such configurations are expressed by one of the exemplary embodiments in the drawings, a plan view of the flap type electronic automatic transmission lever according to an exemplary embodiment of the present invention is shown in FIG. 1, a rear view of the flap type electronic automatic transmission lever according to an exemplary embodiment of the present invention is shown in FIG. 2, and a side view of the flap type electronic automatic transmission lever according to an exemplary embodiment of the present invention is shown in FIG. 3.

The console surface 100 of the present invention is installed in a flat box shape in order to protect the transmission lever from dust and impact, and a position thereof can be installed in various places, such as a space between a driver seat and a passenger seat or a front surface of dash board, as needed.

Further, the console surface 100 can form a transmission stage flap unit 200 at the center thereof, and a button for instructing the execution of various functions can be mounted in an empty space. For example, it is possible to improve the convenience of driving by utilizing the empty space of the console surface, such as a frequency and volume control buttons of radio, operation and control buttons of heating and cooling air conditioning device, and operation buttons of heating seats mounted on the driver seat and the passenger seat.

Meanwhile, at the center of the console surface 100, a transmission stage flap unit 200 electrically connected to the transmission control device of a vehicle and constituted by at least four or more transmission stage flaps is formed.

The transmission stage flap unit 200 includes a parking transmission stage flap (P) 210, a reverse transmission stage flap (R) 220, a neutral transmission stage flap N (230), and a driving transmission stage flap (D) 240 corresponding to each of P, R, N, and D transmission stage that are essential for operation of the vehicle, and can further include a high transmission stage flap or a low transmission stage flap.

The arrangement order of the transmission stage flaps can also be used by changing the direction in which the convenience is improved as needed, but it is most preferred that the parking transmission stage flap 210 be disposed on the uppermost side, and the reverse transmission stage flap 220, the neutral transmission stage flap 230, the driving transmission stage flap 240, the high or low transmission stage flap be disposed sequentially under the parking transmission stage flap 210.

Figure 4:
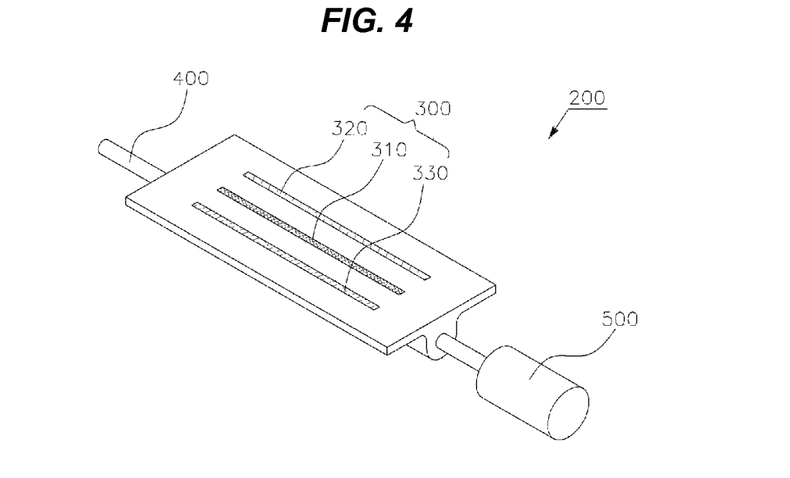
FIG. 4 is a perspective view of a transmission stage flap according to an exemplary embodiment of the present invention.

The upper surface of the transmission stage flap is in the rectangular or oval form of a flat shape so that a driver can easily touch, and a lower part thereof is formed with a hole to be configured to be connected and fixed to the shaft 400.

Moreover, it is preferred that the transmission stage flaps be formed in different colors so that the driver is configured to more easily distinguish the transmission stages, and thus, there is an advantage of being configured to improve the beauty of the vehicle.

FIG. 4 shows a perspective view of the transmission stage flap according to an exemplary embodiment of the present invention.

As shown in FIG. 4, the touch sensor units 300 are mounted on the transmission stage flaps, respectively. The touch sensor unit includes a transmission stage recognition sensor 310 mounted at the center of the transmission stage flap, a forward rotation recognition sensor 320 mounted on the upper side of the transmission stage flap, and a backward rotation recognition sensor 330 mounted on the lower side of the transmission stage flap, and uses a type in which a step motor 500 rotates at a certain angle by the touch recognition of the touch sensor unit. The rotation process of the transmission stage flap according to the order of recognition of the touch sensor unit will be described later.

Meanwhile, a shaft 400 is connected to the lower part of the transmission stage flap so that the transmission stage flap can rotate, the step motor 500 for allowing the shaft to rotate forward or backward at a predetermined angle is connected to one terminal end of the shaft, and a shaft fixing unit 600 for preventing the shaft from falling out is connected to an opposite terminal end of the shaft.

The step motor 500 refers to an electric motor that rotates at a predetermined angle by voltage of a pulse shape, and has characteristics in which an angle of rotation is proportional to the number of the input pulse signal, and the rotational speed is proportional to the frequency of the input pulse signal. There is a difference depending on the structure of the step motor, but it is possible to perform the precise control up to minimum 1.5° step by step, and it is also possible to use by adding a pair worm gears having a transmission ratio greater than 1 to the step motor.

Figure 5:
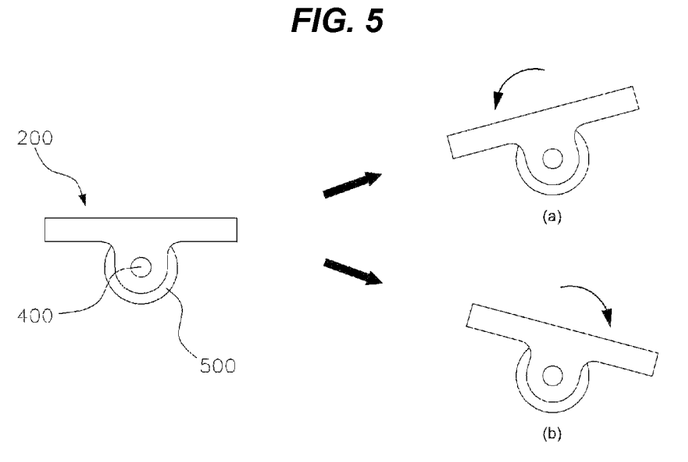
FIG. 5 is a side view showing forward and rearward rotation of the transmission stage flap according to an exemplary embodiment of the present invention.

Through the above-described configuration, the transmission stage flap can rotate forward or backward by a certain range, and a side view showing the forward and backward rotation of the transmission stage flap according to an exemplary embodiment of the present invention is shown in FIG. 5.

As shown in the drawings, the step motor 500 rotates the shaft 400, and the transmission stage flap connected to the shaft rotates forward or backward, by rotation of the shaft. The degree of rotation can be adjusted by various conditions such as the form and the configuration of the console surface 100, and the shape and the size of the transmission stage flap, and is preferred to rotate within a range of 3° to 30°.

Additionally, light sources are disposed by the same number as the number of transmission stage flaps on the lower parts of each of the transmission stage flaps, and it is possible to more clearly display the current transmission stage of the vehicle, by lighting of only the light source of the lower part of the transmission stage flap.

Figure 6A:
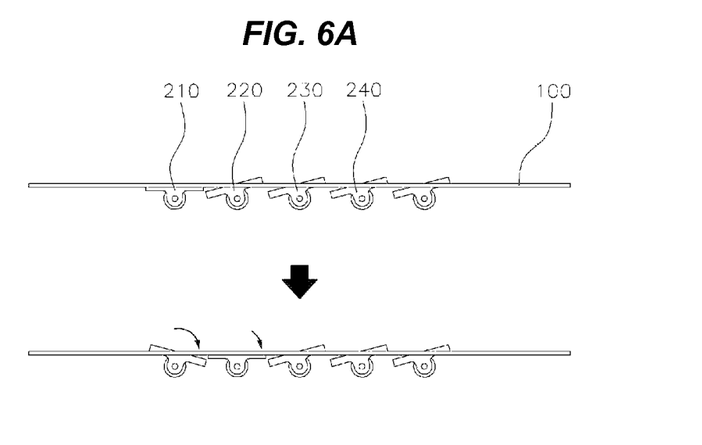
FIG. 6A and FIG. 6B are schematic views illustrating a transmission stage switch from a parking transmission stage (P stage) to a reverse transmission stage (R stage) according to an exemplary embodiment of the present invention.
Figure 6B:
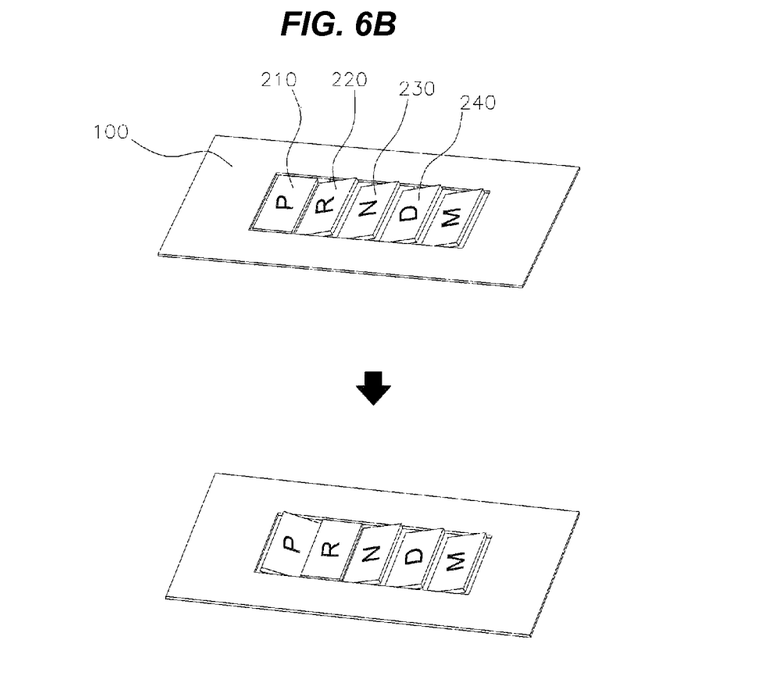

FIGS. 6A and 6B illustrate diagrams showing the transmission stage switch from the parking transmission stage (P stage) to the reverse transmission stage (R stage) according to an exemplary embodiment of the present invention.

First, when the current transmission stage corresponds to the parking transmission stage, the parking transmission stage flap 210 is maintained in a flat state, and other remaining transmission stage flaps are in a state of rotating in the direction of the parking transmission stage flap by the step motor 500, respectively.

Thereafter, when the touch is recognized in the order of the transmission stage recognition sensor 310 of the parking transmission stage flap 210, the backward rotation recognition sensor 330 of the parking transmission stage flap, and the transmission stage recognition sensor of the reverse transmission stage flap 220, the parking transmission stage flap rotates in the direction of the reverse transmission stage flap, the reverse transmission stage flap rotates to become a flat state, and other remaining transmission stage flaps maintain the current state without rotation.

Since the forward rotation recognition sensor 320 of the reverse transmission stage flap 220 is hard to recognize the touch due to the inclined slope, the sensor does not contribute to the transmission stage switching process as described above, and the same also applies to other transmission stage flaps.

An operation, in which the transmission stage flap which does not correspond to the current transmission stage of the vehicle is rotated in the direction of the transmission stage flap which corresponds to the current transmission stage, is to allow the transmission stage to be easily switched in preparation for another transmission stage switch which may occur later.

Accordingly, the driver is configured to easily recognize that a finger currently touches which transmission stage flap only by sense of hand while only observing forward, without observing the console surface 100 and the transmission stage flap unit 200.

Figure 7A:
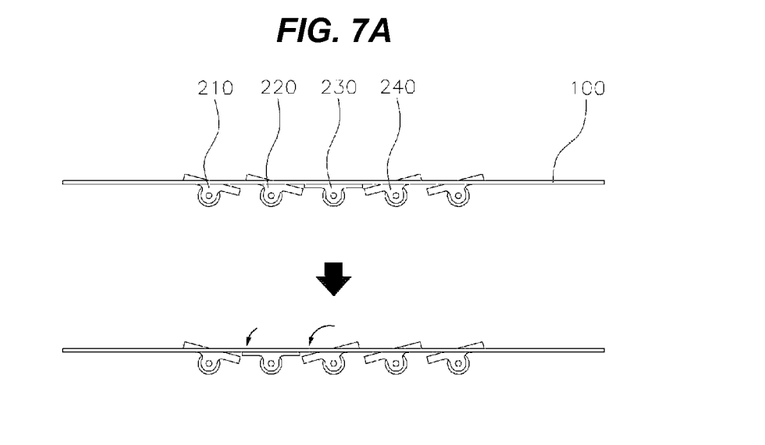
FIG. 7A and FIG. 7B are schematic views illustrating a transmission stage switch from a neutral transmission stage (N stage) to the reverse transmission stage (R stage) according to an exemplary embodiment of the present invention.
Figure 7B:
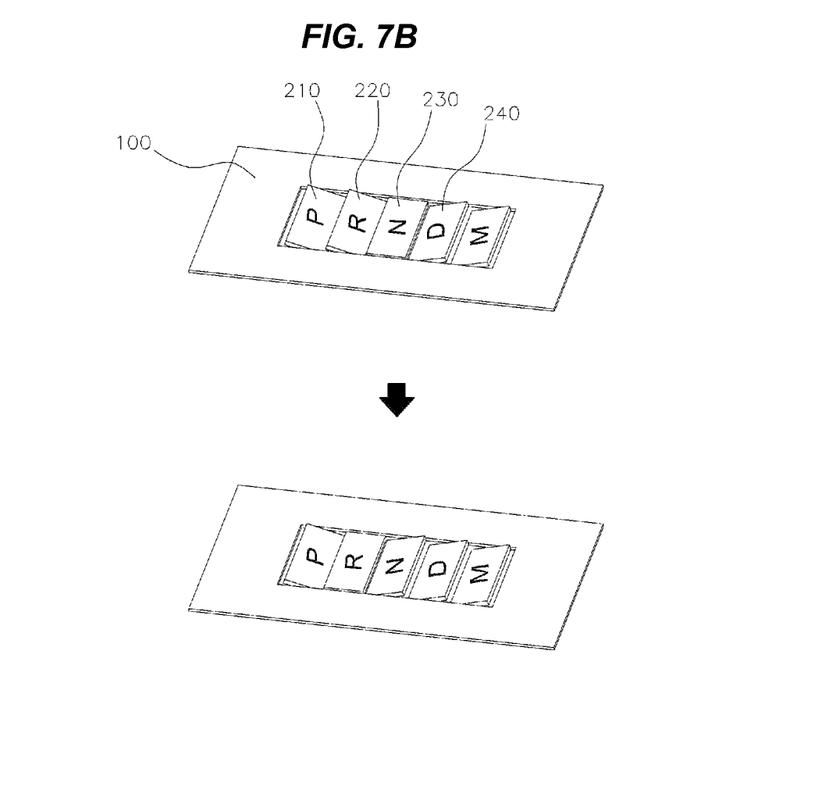

FIGS. 7A and 7B show exemplary diagrams illustrating the switching of the transmission stage from the neutral transmission stage (N stage) to the reverse transmission stage (R stage) according to an exemplary embodiment of the present invention.

Similar to the contents described above, first, when the current transmission stage corresponds to the neutral transmission stage, the neutral transmission stage flap 230 is maintained in a flat state, and other remaining transmission stage flaps are in a state of rotating in the direction of the neutral transmission stage flap.

Thereafter, when the touch is recognized by the transmission stage recognition sensor 310 of the neutral transmission stage flap 230, the forward rotation recognition sensor 320 of the neutral transmission stage flap, and the transmission stage recognition sensor 310 of the reverse transmission stage flap 220, the neutral transmission stage flap is rotated in the direction of the reverse transmission stage flap, the reverse transmission stage flap rotates to become a flat state, and the remaining transmission stage flaps are maintained in the current state without rotation.

It is possible to easily perform the switching of other transmission stages in the same way in addition to the switching of the transmission stage, and the way is also the same as described above.

Figure 8:
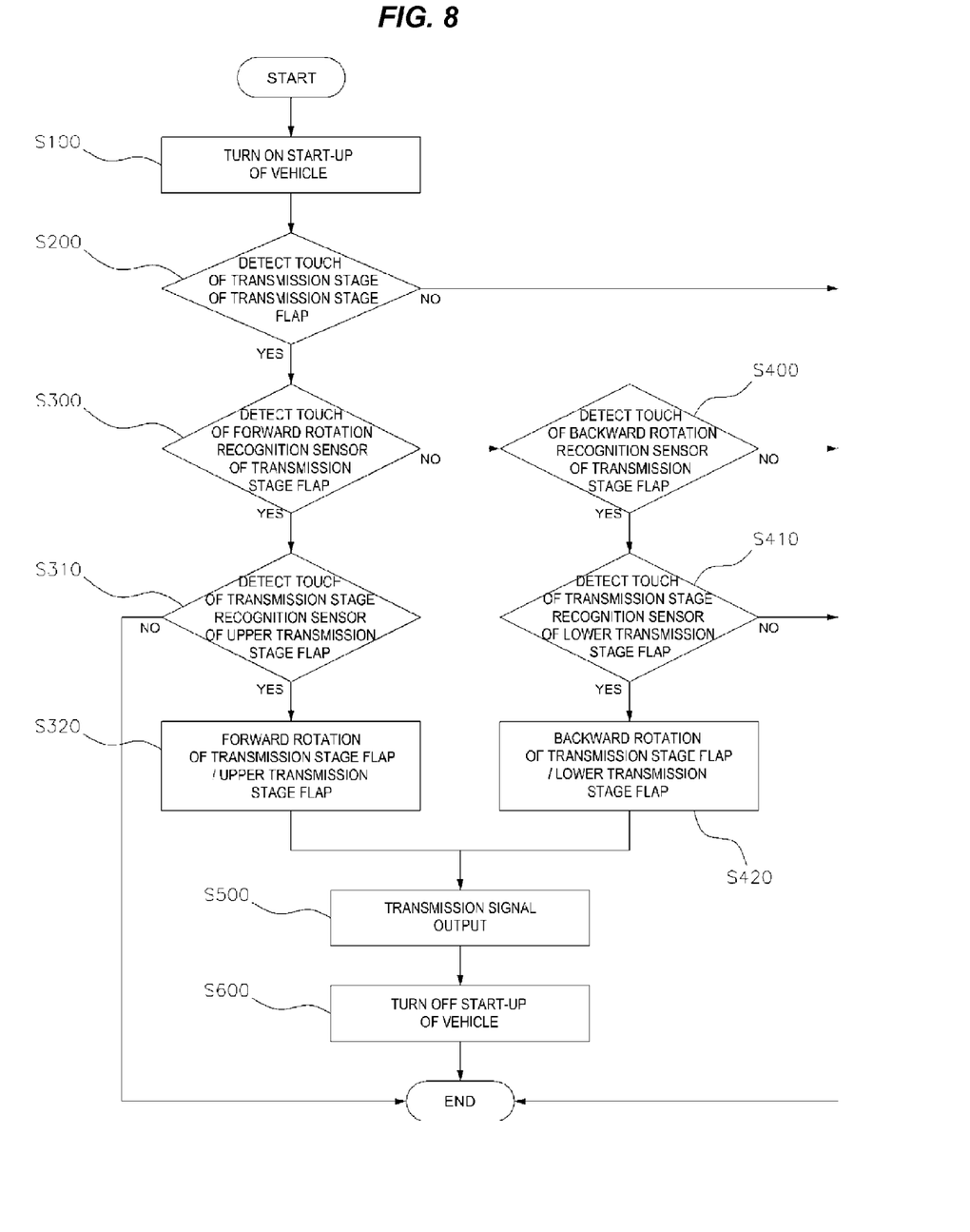
FIG. 8 is a flowchart of a control method of the flap type electronic automatic transmission lever according to an exemplary embodiment of the present invention.

A method of switching the transmission stage using the flap type electronic automatic transmission lever will be described below, first, a flow chart of the control method of the flap type electronic automatic transmission lever according to an exemplary embodiment of the present invention is shown in FIG. 8.

As shown in the drawings, first, after the start-up of the vehicle is turned on (S100), the switching of the transmission stage is performed.

Thereafter, it is determined whether the transmission stage recognition sensor mounted at the center of any one transmission stage flap of a transmission stage flap unit constituted by the order of the parking transmission stage flap P, the reverse transmission stage flap R, the neutral transmission stage flap N, the driving transmission stage flap D, and the high/low transmission stage flap detects the touch (S200), and it is determined whether the forward rotation recognition sensor mounted on the upper side of the transmission stage flap detects the touch (S300) or whether the backward rotation recognition sensor mounted on the lower side of the transmission stage flap detects the touch (S400).

The forward rotation recognition sensor and the backward rotation recognition sensor serve to detect whether a user operates the transmission stage in the upward direction or in the downward direction and transmits the detected result to the control unit.

Moreover, when it is determined that the forward rotation recognition sensor detects the touch, it is determined whether the transmission stage recognition sensor of the upper transmission stage flap located on the upper side of the transmission stage flap detects the touch (S310), and when it is determined that the backward rotation recognition sensor detects the touch, it is determined whether the transmission stage recognition sensor of the lower transmission stage flap located on the lower side of the transmission stage flap detects the touch (S410).

Here, the upper transmission stage flap does not refer to a specific transmission stage flap, but refers to a transmission stage flap located just above the transmission stage flap in which the touch is first detected by the transmission stage recognition sensor. That is, when the transmission stage flap in which the touch is first detected by the transmission stage recognition sensor is a neutral transmission stage, the upper transmission stage flap corresponds to the reverse transmission stage flap.

Similarly, the lower transmission stage flap refers to the transmission stage flap located just below the transmission stage flap in which the touch is first detected by the transmission stage recognition sensor. When the transmission stage flap in which the touch is first detected by the transmission stage recognition sensor is the neutral transmission stage, the lower transmission stage flap corresponds to the driving transmission stage flap.

Thus, when it is determined that the transmission stage recognition sensor of the upper transmission stage flap detects the touch, it is determined that the transmission stage is switched upward, the step motor rotates the transmission stage flap and the upper transmission stage flap forward (S320), and when it is determined that the transmission stage recognition sensor of the lower transmission stage flap detects the touch, it is determined that the transmission stage is switched downward, and the step motor rotates the transmission stage flap and the lower transmission stage flap backward (S420).

As a result, as the current transmission stage flap is switched, the control unit outputs the transmission signal of the transmission stage corresponding to the upper or the lower transmission stage flap (S500), and when there is no need for further shift of the vehicle, that is, when finishing the use of the vehicle, the start-up of the vehicle is switched into an OFF state (S600).

The switching process of the transmission stage described above can be frequently applied while the vehicle is driving, and it is needless to say that it is possible to switch the transmission stage from top to bottom, from bottom to top, and by continuously two or more stages.

Figure 9:
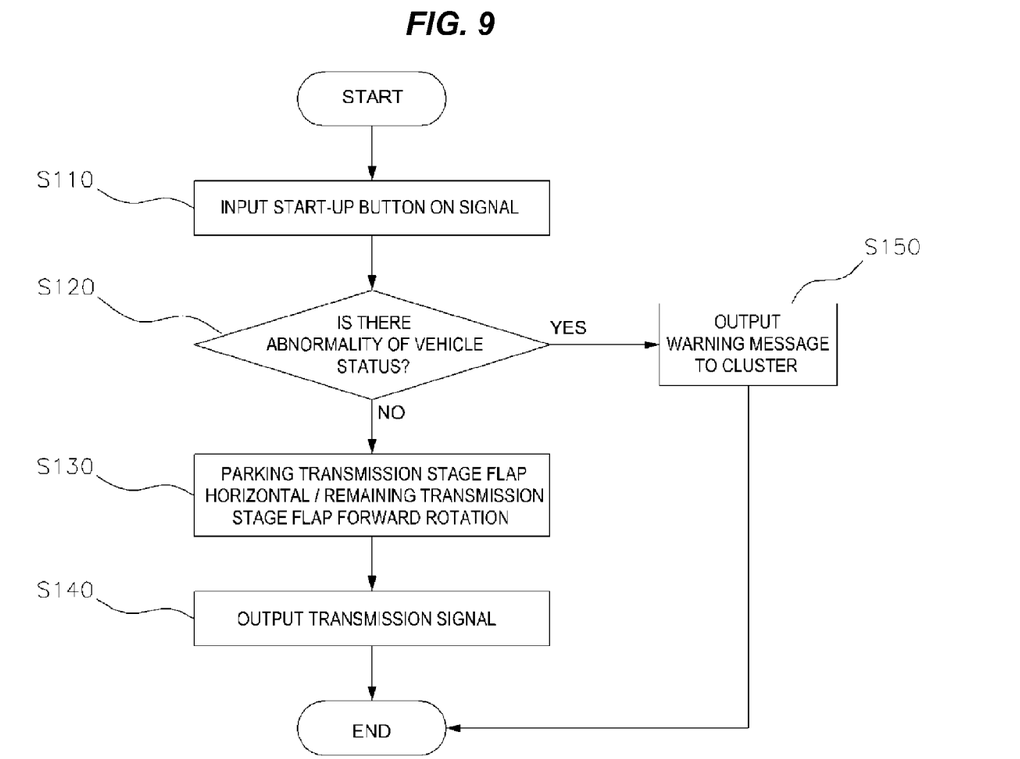
FIG. 9 is a flowchart of a control method of the flap type electronic automatic transmission lever when start-up is on (ON) according to an exemplary embodiment of the present invention.

Meanwhile, FIG. 9 shows a flow chart of the flap type electronic automatic transmission lever control method according to an exemplary embodiment of the present invention when the start-up is ON.

As for the sequence, first, the ON signal of the start-up button is input to the control unit (S110) and the status information of a vehicle is checked (S120), and then, when there is no abnormality in the status information of the vehicle, the step motor maintains the horizontal state of the parking transmission stage flap as it is, and rotates the remaining transmission stage flaps forward (S130).

This is for starting the driving in the state of the parking transmission stage, when an abnormality is found in the information status of the vehicle, the control unit outputs a warning message through a cluster (S150), and otherwise, the control unit eventually outputs the transmission signal corresponding to the parking transmission stage (S140).

Figure 10:
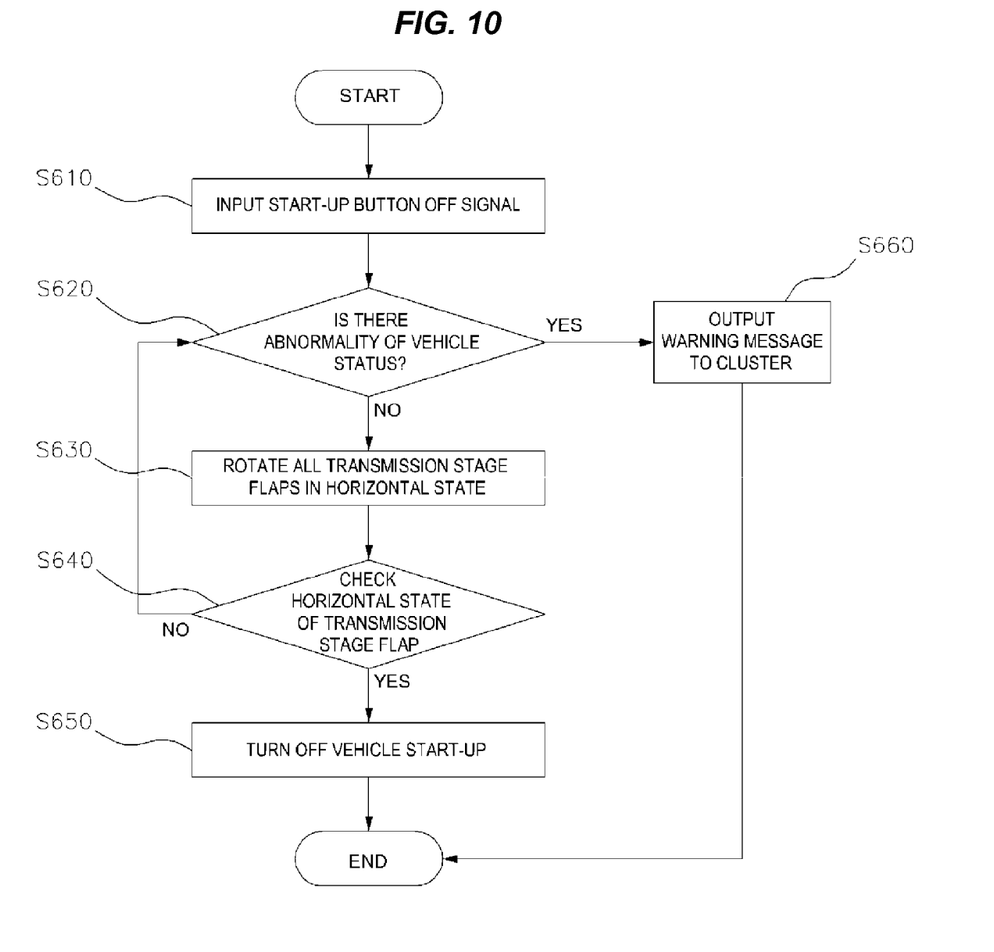
FIG. 10 is a flowchart of a control method of the flap type electronic automatic transmission lever when start-up is off (OFF) according to an exemplary embodiment of the present invention.

FIG. 10 shows a flow chart of the flap type electronic automatic transmission lever control method during start-up OFF according to an exemplary embodiment of the present invention.

Similar to the control method when the start-up is ON, first, an OFF signal of the start-up button is input to the control unit (S610) and the status information of the vehicle is checked (S620), and then, when there is an abnormality of the status information of the vehicle, the control unit outputs the warning message through the cluster (S660), and when there is no abnormality, the step motor rotates all the transmission stage flaps forward of the transmission stage flap unit in the horizontal state (S630).

Thereafter, the control unit checks the horizontal state of the transmission stage flap (S640) and then turns off the start-up of the vehicle (S650).

This is for preventing the failure phenomenon in which the transmission stage flap has a slope rather than horizontal slope in a state in which the start-up of the vehicle is turned off, and it is desirable to take the above-described step when turning off the start-up in the parking transmission stage flap or turning off the start-up in the neutral transmission stage flap using a shift lock release button.

In addition, the transmission signal output stage of the transmission stage in an exemplary embodiment of the present invention preferably outputs the transmission signal only in the case where a brake pedal stop lamp switch signal is generated when the upper transmission stage flap or the lower transmission stage flap corresponds to the reverse transmission stage flap.

This is to prevent accidents that may occur due to the sudden switching of the transmission stage to the reverse transmission stage in a state in which the driver does not watch the rear or does not consider the rear obstacles.

It is also possible to use the brake pedal stop lamp switch signal for all transmission stage switching as required, it is preferred to essentially use the brake pedal stop lamp switch signal when switching to the reverse transmission stage.

Figure 11:
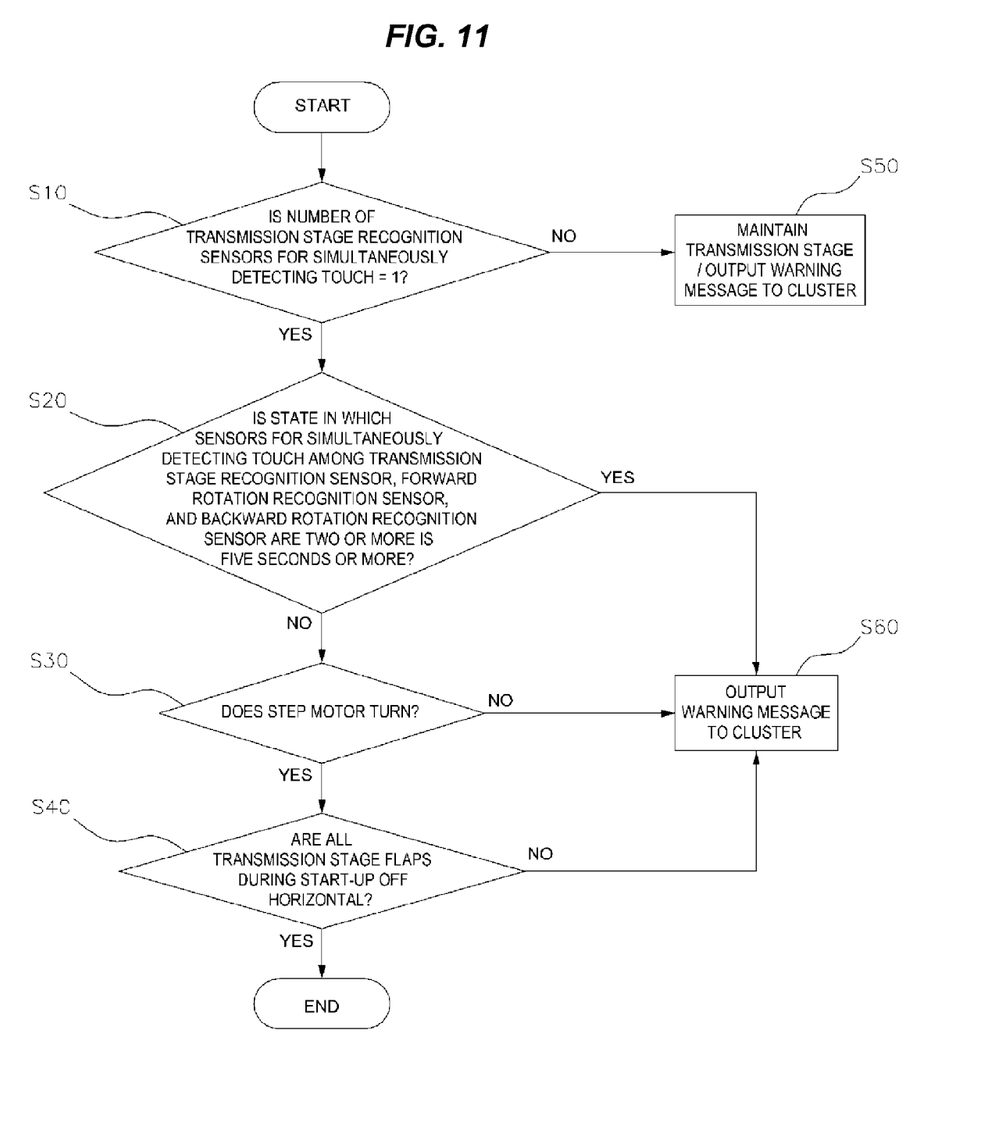
FIG. 11 is a flowchart of the flap type electronic automatic transmission lever safety control method according to an exemplary embodiment of the present invention.

FIG. 11 shows a flow chart of the flap type electronic automatic transmission lever safety control method according to an exemplary embodiment of the present invention.

As a method for safely using the vehicle to which the flap type electronic automatic transmission lever is applied, the control unit checks the number of the transmission stage recognition sensors for simultaneously detecting the touch (S10), checks whether a state in which the sensors for simultaneously detecting the touch among the transmission stage recognition sensor, the forward rotation recognition sensor, or the backward rotation recognition sensor are at least two or more is continued for 5 seconds or more (S20), checks whether the step motor is normally operated by detection of the sensor (S30), and checks whether all the transmission stage flaps of the transmission stage flap unit are in a horizontal state when the start-up of the vehicle is off (S40).

If the number of the transmission stage recognition sensors for simultaneously detecting the touch is two or more, the control unit maintains the existing transmission stage as it is without switching the transmission stage, and outputs the warning message to the cluster (S50).

Furthermore, when the state in which the sensors for simultaneously detecting the touch among the transmission stage recognition sensor, the forward rotation recognition sensor, or the backward rotation recognition sensor are at least two or more is continued for 5 seconds or more, when the step motor is not normally operated, or when all the transmission stage flaps have a slope other than the horizontal state when the start-up of the vehicle is off, the control unit outputs the warning message through the cluster (S60).

The driver who confirmed the warning message can personally take steps for solving the problems in the control method or can solve the fault status through the maintenance of the vehicle, thereby further improving the safety of the vehicle.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A flap type electronic automatic transmission lever control method comprising:
    a step of turning on a start-up of a vehicle by a control unit;
    a step of detecting a touch by a transmission stage recognition sensor mounted at a center of a transmission stage flap of a transmission stage flap unit constituted in an order of a parking transmission stage flap (P), a reverse transmission stage flap (R), a neutral transmission stage flap (N), a driving transmission stage flap (D), and a high stage/low stage transmission stage flap;
    a step of detecting a touch by a forward rotation recognition sensor mounted on an upper side of the transmission stage flap or a backward rotation recognition sensor mounted on a lower side thereof;
    a step of detecting the touch by a transmission stage recognition sensor of an upper transmission stage flap located on the upper side of the transmission stage flap when the forward rotation recognition sensor detects the touch, or detecting the touch by a transmission stage recognition sensor of a lower transmission stage flap located on the lower side of the transmission stage flap when the backward rotation recognition sensor detects the touch;
    a step of rotating the transmission stage flap and the upper transmission stage flap forward or rotating the transmission stage flap and the lower transmission stage flap backward by a step motor;
    a step of outputting a transmission signal of the transmission stage corresponding to the upper transmission stage flap or the lower transmission stage flap by the control unit; and
    a step of turning OFF the start-up of the vehicle by the control unit.

2. The flap type electronic automatic transmission lever control method of claim 1, wherein the step of turning on the start-up of the vehicle includes:
    a step of inputting an ON signal of a start-up button to the control unit;
    a step of checking status information of the vehicle by the control unit;
    a step of maintaining a horizontal state of the parking transmission stage flap (P) and rotating remaining transmission stage flaps forward by the step motor when there is no abnormality in the status information of the vehicle; and
    a step of outputting the transmission signal of the parking transmission stage by the control unit.

3. The flap type electronic automatic transmission lever control method of claim 2, wherein after the step of checking the status information of the vehicle, further comprising:
    a step of outputting a warning message to a cluster by the control unit when there is an abnormality in the state information of the vehicle.

4. The flap type electronic automatic transmission lever control method of claim 1, wherein the step of turning off the start-up of the vehicle includes:
    a step of inputting an OFF signal of the start-up button to the control unit;
    a step of checking status information of the vehicle by the control unit;
    a step of rotating all the transmission stage flaps of the transmission stage flap unit in a horizontal state by the step motor when there is no abnormality in the status information of the vehicle; and
    a step of turning off the start-up of the vehicle after checking the horizontal state of the transmission stage flap by the control unit.

5. The flap type electronic automatic transmission lever control method of claim 1, wherein the step of outputting the transmission signal of the transmission stage outputs the transmission signal only in a case where a brake pedal stop lamp switch signal is generated when the upper transmission stage flap or the lower transmission stage flap corresponds to the reverse transmission stage flap.

6. A flap type electronic automatic transmission lever safety control method,
    wherein in switching the transmission stage of the vehicle using the flap type electronic automatic transmission lever control method of claim 1, comprising:
    a step of checking the number of the transmission stage recognition sensors for simultaneously detecting the touch by the control unit;
    a step of checking whether a state in which the sensors for simultaneously detecting the touch among the transmission stage recognition sensor, the forward rotation recognition sensor, or the backward rotation recognition sensor are at least two or more is continued for 5 seconds or more by the control unit, when the number of the transmission stage recognition sensor for simultaneously detecting the touch is one;
    a step of checking whether the step motor rotates by the control unit due to the detection of the sensor, when a state in which the sensors for simultaneously detecting the touch are at least two is less than 5 seconds; and
    a step of checking whether all the transmission stage flaps of the transmission stage flap unit are in a horizontal state during start-up off of the vehicle by the control unit, when the step motor rotates.

7. The flap type electronic automatic transmission lever safety control method of claim 6, wherein after the step of checking the number of the transmission stage recognition sensors for simultaneously detecting the touch, further comprising:
    a step of maintaining an existing transmission stage without switching the transmission stage and outputting a warning message to a cluster by the control unit, when the transmission stage recognition sensors for simultaneously detecting the touch are two or more.

8. The flap type electronic automatic transmission lever safety control method of claim 6, further comprising:
a step of outputting a warning message to a cluster by the control unit when a state in which the sensors for simultaneously detecting the touch among the transmission stage recognition sensor, the forward rotation recognition sensor, or the backward rotation recognition sensor are at least two or more is continued for 5 seconds or more,
when the step motor does not rotate even by detection of the sensor, or
when all the transmission stage flaps of the transmission stage flap unit are not in a horizontal state during start-up off of the vehicle.

* * * * *